Nov. 1, 1949     A. W. MEYNIG     2,486,962
STUFFING BOX SUPPORT
Filed Oct. 29, 1947     2 Sheets-Sheet 1
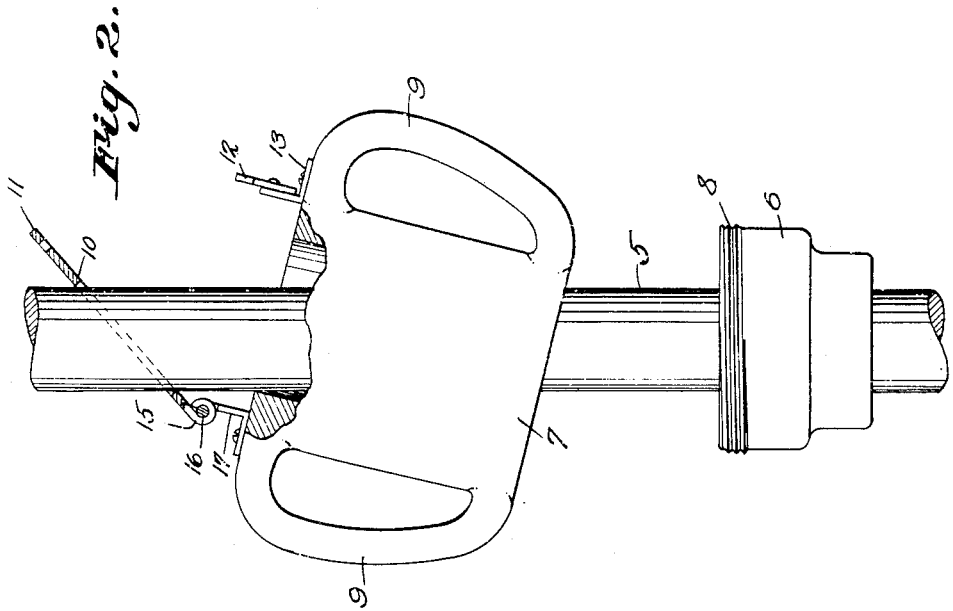
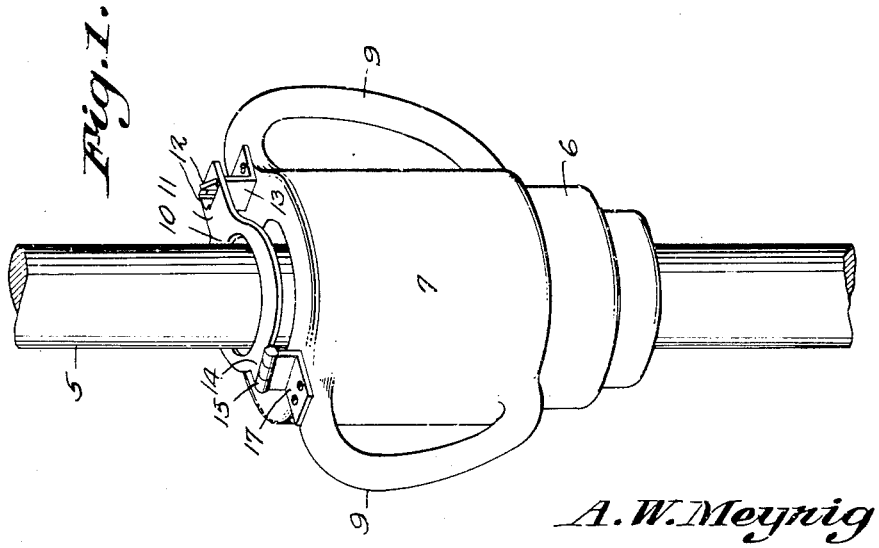
A. W. Meynig
INVENTOR
BY *Crowles*
ATTORNEYS.

Nov. 1, 1949 A. W. MEYNIG 2,486,962
STUFFING BOX SUPPORT
Filed Oct. 29, 1947 2 Sheets-Sheet 2
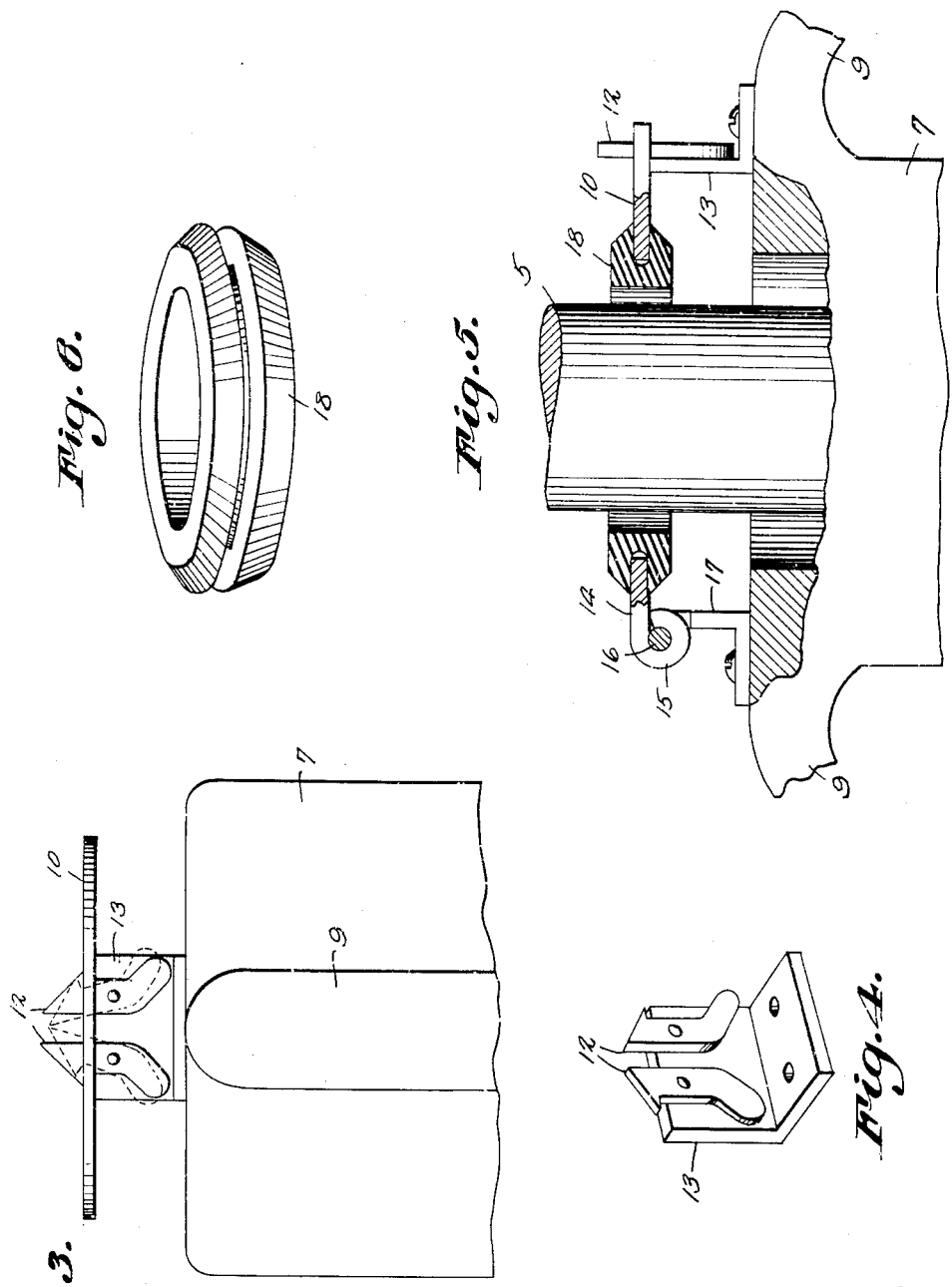
A. W. Meynig
INVENTOR Patented Nov. 1, 1949

2,486,962

UNITED STATES PATENT OFFICE 2,486,962

STUFFING BOX SUPPORT

August W. Meynig, Westbrook, Tex.

Application October 29, 1947, Serial No. 782,890

4 Claims. (Cl. 286—1)

By way of explanation, it might be stated that when stuffing box packings become worn and allow the passage of oil thereby, packings which are usually rubber, are replaced. To replace these packing rubbers, it is necessary to detach the upper portion of the stuffing box from the lower portion, and elevate the upper portion to a position out of the way of the operator installing the new rubbers.

By known means for holding the upper portion of the packing box suspended, the upper portions of the stuffing boxes frequently fall resulting in injury to the hands of the person making the installation.

It is therefore the primary object of the present invention to provide means which will securely hold the upper portion of a stuffing box elevated, while the packing rubbers of the stuffing box are being replaced.

An important object of the invention is to provide a device of this character which will be made a part of the upper portion of the stuffing box, so that it will be accessible at all times for use.

Another object of the invention is to provide a holder of this character which will securely grip the polish rod, the gripping means being of the type to become wedged under the weight of the upper section of the stuffing box, thereby insuring against the upper section of the stuffing box slipping downwardly.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings

Figure 1 is a perspective view illustrating a polish rod and a stuffing box equipped with a supporting device constructed in accordance with the invention, as mounted thereon.

Fig. 2 is an elevational view illustrating the upper section of the stuffing box as elevated and held in place by the device forming the subject matter of the present invention.

Fig. 3 is an enlarged elevational view illustrating the pivoted latch members which cooperate with the holding plate for normally holding the plate in its inactive position.

Fig. 4 is a perspective view of the plate and latch members which are supported on the plate.

Fig. 5 is an elevational view partly in section, illustrating the upper section of the stuffing box as equipped with a holding device constructed in accordance with the invention.

Fig. 6 is a perspective view of the rubber grommet which is fitted within the opening of the holding plate.

Referring to the drawings in detail, the reference character 5 indicates a section of a polish rod, and the reference character 6 indicates the lower portion of a stuffing box which is connected at the top of the tubing of the well, by the usual threaded means.

The stuffing box includes an upper section 7 which is connected to the lower portion thereof by the threads 8, the upper section of the stuffing box being provided with hand grips 9, by means of which the upper section of the stuffing box may be handled and rotated to secure it by the threaded connection, to the lower section of the stuffing box.

The lower section of the stuffing box carries the usual stuffing box packing rubbers, not shown, which become worn due to the operation of the polish rod therethrough. To replace the rubbers, it is necessary to detach the upper section of the stuffing box and elevate it to a position as shown by Fig. 2 of the drawings, whereupon the operator will have easy access to the rubbers.

The support embodies a substantially circular plate 10 formed with a central opening so that it may be fitted over a polish rod of a pump structure, the opening of the plate being appreciably larger than the polish rod over which the plate is positioned. The plate 10 is provided with an extension 11 formed with an elongated opening providing a keeper for the latch members 12 that are pivotally mounted on the bracket 13 that in turn is secured to the upper surface of the upper section 7 of the stuffing box, as clearly shown by the drawings.

The reference character 14 indicates an extension disposed directly opposite to the extension 11, the extension 14 being provided with a hinge section 15 that is bent around the hinge pin 16, forming a part of the stationary section 17 of the hinge, the stationary section 17 of the hinge being secured to the opposite side of the upper section 7 of the stuffing box. It will of course be understood that the opening in the upper section of the stuffing box is also appreciably larger than the polish rod, to permit the upper section 7 of the stuffing box to tilt as clearly illustrated by Fig. 2 of the drawings. Under normal conditions, the plate 10 will assume the position as shown by Fig. 1 of the drawings, wherein the inner surface of the opening of the plate 10 will be spaced from the polish rod.

Should it be desired to elevate the upper section of the stuffing box to the position as shown by Fig. 2 of the drawings, where it will be out of the way to give the person removing the packing rubbers ample room to accomplish this work, the latch members 12 are moved to disengage the keeper opening of the plate 10, allowing the plate to swing upwardly.

It is obvious that due to the mounting of the plate on the upper section of the stuffing box, the plate will take an inclined position and be caused to wedge against the polish rod, supporting the upper section of the stuffing box in an elevated position.

It may be desirable to use a rubber friction ring in connection with the plate 10, and in this case, a grommet such as indicated by the reference character 18 may be used, the grommet being constructed circular in formation to fit within the opening of the circular plate 10, the grommet having an annular groove so that it may be positioned and firmly secured to the plate, as shown by Fig. 5.

From the foregoing detail description, it is believed that a further description as to the operation of the device in supporting the upper section of a stuffing box, is unnecessary.

Having thus described the invention, what is claimed is:

1. A temporary support for supporting the upper section of the stuffing box of an oil well pumping apparatus on the polish rod thereof, comprising a plate pivotally connected with the upper section of the stuffing box, said plate having an opening of a diameter appreciably greater than the diameter of the polish rod, means for normally holding the plate parallel with the upper section, said plate adapted to swing upwardly at an oblique angle with respect to the polish rod, the wall of the opening binding against the polish rod supporting the upper section of the stuffing box in spaced relation with the main portion of the stuffing box.

2. A temporary support for supporting the upper section of the stuffing box of an oil well pumping apparatus on the polish rod thereof during packing of the lower section of the stuffing box, comprising a plate pivotally connected at one of its ends with the upper section of the stuffing box said plate having an opening through which the polish rod extends, pivoted latch members connected with the opposite end of the plate normally holding the plate in spaced parallel relation with the upper section of the stuffing box, said latch member adapted to release one side of the plate whereby the plate swings upwardly, the wall of the plate engaging the polish rod setting up a binding action, supporting the upper section of the stuffing box spaced from the lower section thereof.

3. A temporary support for supporting the upper section of the stuffing box of an oil well pumping apparatus on the polish rod thereof in spaced relation with the main portion of the stuffing box, comprising a plate pivotally mounted on the upper section of the stuffing box in spaced relation therewith, said plate having a keeper opening, latch members extended into the keeper opening and adapted to normally hold the plate in parallel relation with the upper section of the stuffing box, said latch members adapted to release the plate for pivotal movement said plate having an opening through which the polish rod extends, the opening of the plate being appreciably larger in diameter than the polish rod, the wall of said opening binding against the polish rod when the plate swings upwardly, supporting the upper section of the stuffing box on the polish rod.

4. A temporary support for supporting the upper section of the stuffing box of an oil well pumping apparatus on the polish rod in spaced relation with the lower section of the stuffing box during packing of the stuffing box, comprising a member having an opening through which the polish rod extends, pivotally mounted on the upper surface of the upper section of the stuffing box, the opening of the pivoted member being of a diameter appreciably greater than the diameter of the polish rod extended therethrough, means for normally holding the pivoted member in parallel relation with the upper surface of the upper section of the stuffing box, and said pivoted member being movable to a position in gripping relation with the polish rod supporting the upper section of the stuffing box elevated above the main section thereof.

AUGUST W. MEYNIG.

REFERENCES CITED

The following references are of record in the file of this patent:

UNITED STATES PATENTS

| Number | Name | Date |
| --- | --- | --- |
| 1,801,448 | Neeley | Apr. 21, 1931 |
| 1,803,569 | Taylor | May 5, 1931 |
| 1,845,143 | Friesner | Feb. 16, 1932 |
| 2,266,935 | Stephens et al. | Dec. 23, 1941 |